(12) United States Patent
Mabee et al.

(10) Patent No.: US 10,201,883 B2
(45) Date of Patent: Feb. 12, 2019

(54) AIR TOOL MONITORING APPARATUS, AIR TOOL INCORPORATING SAME, SYSTEM FOR MONITORING MULTIPLE AIR TOOLS EQUIPPED WITH SAME, AND METHODS OF USING SAME

(71) Applicant: MABEE ENGINEERED SOLUTIONS, INC.

(72) Inventors: Brian D. Mabee, Shelby Township, MI (US); Jeffrey B. Kaplan, Greer, SC (US); Darryl V. Witte, Lee, IL (US); Jason M. Adams, Macomb, MI (US)

(73) Assignee: Mabee Engineering Solutions Inc., Shelby Township, MI (US)

( * ) Notice: Subject to any disclaimer, the term of this patent is extended or adjusted under 35 U.S.C. 154(b) by 148 days.

(21) Appl. No.: 15/211,832

(22) Filed: Jul. 15, 2016

(65) Prior Publication Data
US 2018/0015584 A1    Jan. 18, 2018

(51) Int. Cl.
*B23Q 17/00*    (2006.01)
*B25F 5/00*    (2006.01)

(52) U.S. Cl.
CPC .............. *B23Q 17/008* (2013.01); *B25F 5/00* (2013.01)

(58) Field of Classification Search
None
See application file for complete search history.

(56) References Cited

U.S. PATENT DOCUMENTS

| 3,664,183 A | 5/1972 | Treible, Jr. |
| 3,699,810 A | 10/1972 | Takahashi |
| 4,051,351 A | 9/1977 | Mallick, Jr. et al. |
| 4,237,454 A | 12/1980 | Meyer |
| 4,294,110 A | 10/1981 | Whitehouse |
| 4,620,449 A | 11/1986 | Borries et al. |
| 4,903,783 A | 2/1990 | Rushanan et al. |

(Continued)

FOREIGN PATENT DOCUMENTS

WO    2006/136503 A1    12/2006

OTHER PUBLICATIONS

Extended European search report dated Nov. 30, 2017 issued in the corresponding EP patent application 17181178.9.

*Primary Examiner* — Tung S Lau
(74) *Attorney, Agent, or Firm* — Carrier Blackman & Associates, P.C.; William D. Blackman; Joseph P. Carrier

(57) ABSTRACT

An air tool monitoring apparatus includes a housing having a hollow chamber formed therein, and also having an inlet and an outlet formed therein, each of the inlet and an outlet in fluid communication with the chamber. The apparatus also includes a first sensor for sensing a condition indicative of tool usage, a battery disposed in the housing, and a microprocessor operatively connected to the housing and including a timer, a memory storage module, and a unique identifier. The apparatus further includes a switch for starting and stopping the timer, and a communication device for sending data from the microprocessor to a data collection device. The apparatus may additionally include a second sensor for sensing a condition indicative of tool wear. Methods of using the apparatus, along with systems for monitoring and reporting on usage of multiple air tools equipped with the apparatus, are also described.

17 Claims, 11 Drawing Sheets

(56) References Cited

U.S. PATENT DOCUMENTS

| | | | |
|---|---|---|---|
| 5,590,455 A * | 1/1997 | Kato | B23K 3/0607 |
| | | | 29/564.1 |
| 5,898,379 A | 4/1999 | Vanbergeijk | |
| 6,547,014 B2 | 4/2003 | McCallops et al. | |
| 6,565,293 B2 | 5/2003 | Desmoulins | |
| 6,871,160 B2 | 3/2005 | Jaw | |
| 7,065,456 B1 | 6/2006 | Butka et al. | |
| 7,525,430 B2 | 4/2009 | Nakamura et al. | |
| 7,823,458 B2 | 11/2010 | Kibblewhite et al. | |
| 2005/0170520 A1 | 8/2005 | Schur et al. | |
| 2008/0032601 A1 | 2/2008 | Arcona et al. | |
| 2008/0314488 A1* | 12/2008 | Achterholt | B60C 23/0408 |
| | | | 152/428 |
| 2010/0252288 A1 | 10/2010 | Hsu | |
| 2011/0088921 A1 | 4/2011 | Forgues et al. | |
| 2014/0039351 A1* | 2/2014 | Mix | A61B 5/1114 |
| | | | 600/587 |

* cited by examiner

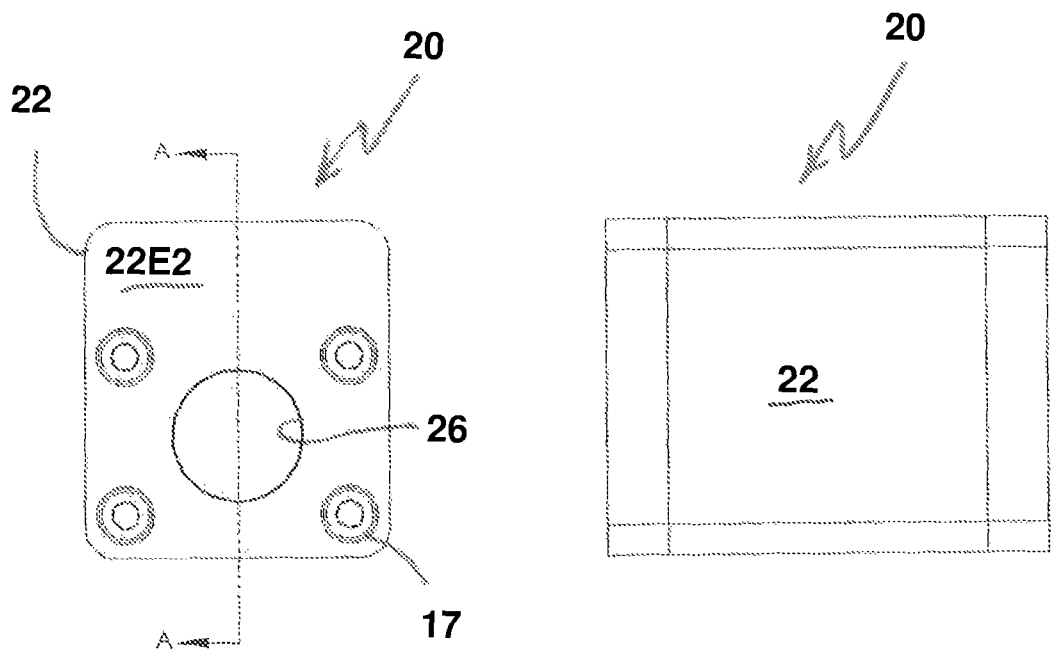
FIG. 1B
FIG.1C
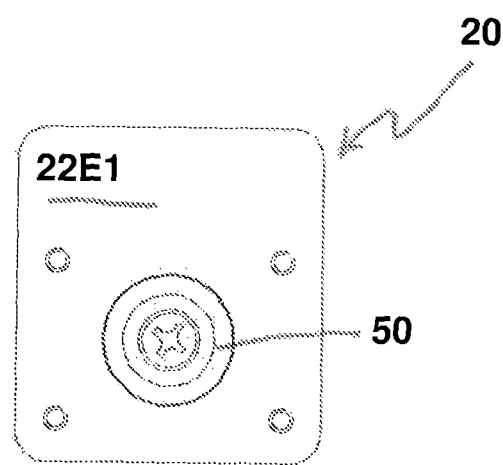
FIG. 1D

AIR TOOL MONITORING APPARATUS, AIR TOOL INCORPORATING SAME, SYSTEM FOR MONITORING MULTIPLE AIR TOOLS EQUIPPED WITH SAME, AND METHODS OF USING SAME

BACKGROUND OF THE INVENTION

1. Field of the Invention

The present invention relates to an air tool monitoring apparatus, to an air tool incorporating the inventive apparatus, to a system for monitoring multiple air tools, each of which is respectively equipped with the inventive apparatus, and to methods of using the inventive apparatus, air tool, and system.

2. Description of the Background Art

A number of different air tool monitoring systems and devices are known. One example of a commercially available air tool monitoring device is sold under the name "TULMAN" by the Cleco division of the Apex Tool Group, of Sparks, Md.

Examples of some issued patents relating generally to the field of air tool monitoring and/or control systems and devices include those described in Treible, Jr. U.S. Pat. No. 3,664,183, Takahashi, U.S. Pat. No. 3,699,810, Mallick Jr. U.S. Pat. No. 4,051,351, Whitehouse, U.S. Pat. No. 4,294,110, Borries, U.S. Pat. No. 4,620,449, Rushanan, U.S. Pat. No. 4,903,783, Desmoulins, U.S. Pat. No. 6,565,293, Jaw, U.S. Pat. No. 6,871,160, Butka, U.S. Pat. No. 7,065,456 and Kibblewhite, U.S. Pat. No. 7,823,458.

Although the known devices have some utility for their intended purposes, a need still exists in the art for improved air tool monitoring systems and devices. In particular, there is a need for improved air tool monitoring systems and devices which will allow for efficient power usage of the monitoring apparatus, which will permit wireless communication with data storage media, and which will overcome the difficulties encountered with the known art.

SUMMARY OF THE INVENTION

Accordingly, it is an object of the present invention to provide a system, method and apparatus for monitoring air tool usage.

An air tool monitoring apparatus includes a housing having a hollow chamber formed therein, and also having an inlet and an outlet formed therein, each of the inlet and an outlet in fluid communication with the chamber.

The apparatus also includes a first sensor for sensing a condition indicative of tool usage, a battery disposed in the housing, and a microprocessor operatively connected to the housing and including a timer, RAM, ROM, and a unique identifier.

The first sensor may include one or more components selected from the list including accelerometers, air pressure sensors, Hall effect sensors, vibration sensors, and microphones.

The apparatus further includes and a communication device for sending data from the microprocessor to a data collection device.

Optionally, the apparatus may additionally include a second sensor for sensing a condition indicative of tool wear. Where used, the second sensor may include one or more components selected from microphones, accelerometers, vibration sensors, and total usage meters.

Further, the apparatus may include a third sensor for sensing environmental conditions within the chamber, such as temperature, pressure, humidity, or the like.

Optionally, the apparatus may include a display device for displaying information to an operator. Such a display device may include a liquid crystal screen or an LED screen.

The apparatus may be configured as a separate unit configured to be attached to an air tool. Alternatively, the apparatus may be configured as an integral, original equipment component, installed during manufacturing of an air tool, such as inside of a handle of the tool.

Methods of, and systems using the apparatus are also contemplated according to the present invention and are described further herein.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 1B is a first end plan view of the air tool monitoring apparatus of FIG. 1A, showing the outlet end.

FIG. 1C is a side plan view of the air tool monitoring apparatus of FIG. 1A.

FIG. 1D is a second end plan view of the air tool monitoring apparatus of FIG. 1A, showing the inlet end;

DETAILED DESCRIPTION OF EXEMPLARY EMBODIMENTS

Figure 1A:
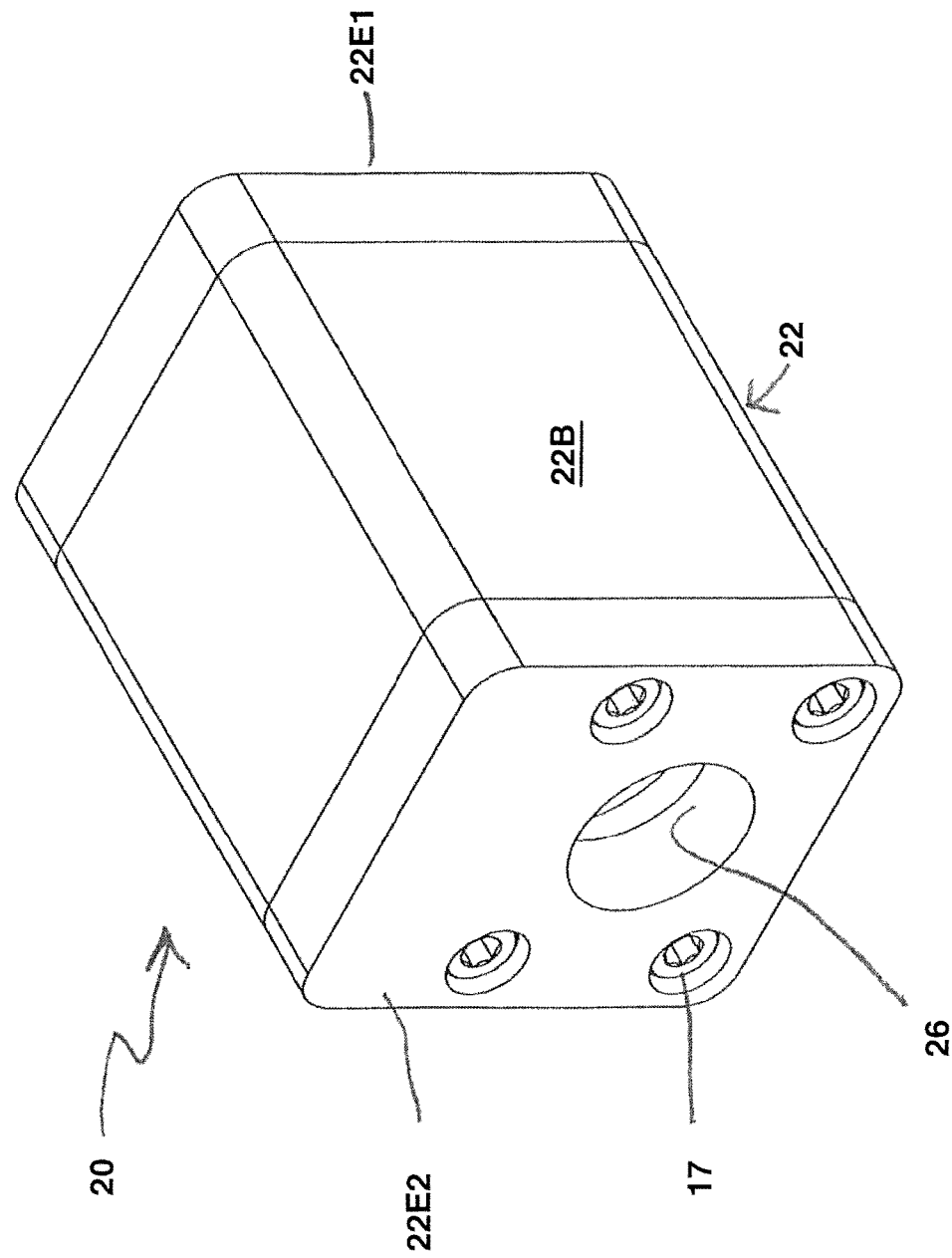
FIG. 1A is a perspective view of an air tool monitoring apparatus according to an illustrative embodiment of the present invention.
Figure 2A:
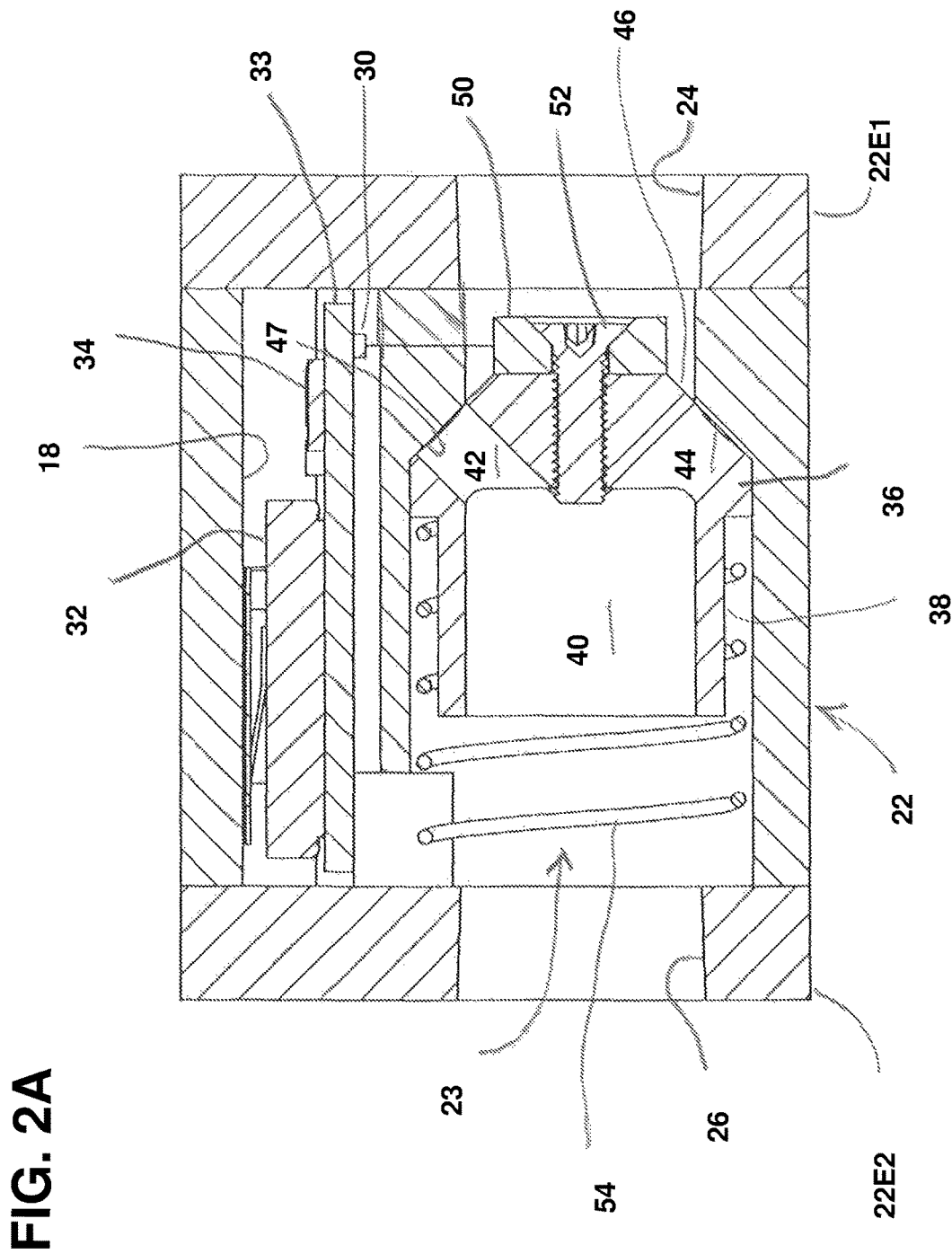
FIG. 2A is a first cross-sectional view of the apparatus of FIG. 1A, taken along a central vertical plane extending in a direction parallel to a longitudinal axis.
Figure 6B:
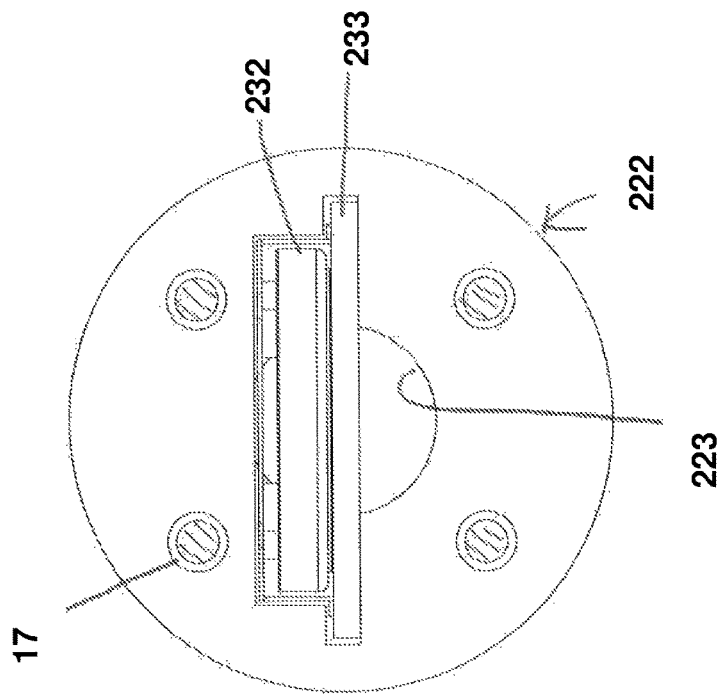
FIG. 6B is an end plan view of the apparatus of FIG. 6A, showing the outlet end with an end cap removed.
Figure 2B:
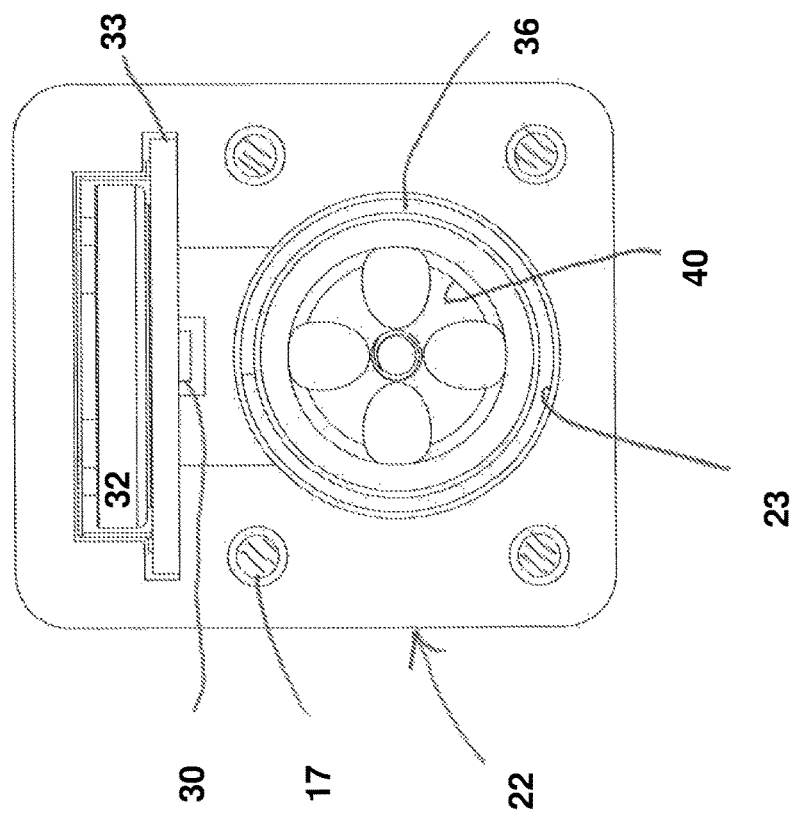
FIG. 2B is an end plan view of the apparatus of FIG. 1A, showing the outlet end with an end cap removed.
Figure 3:
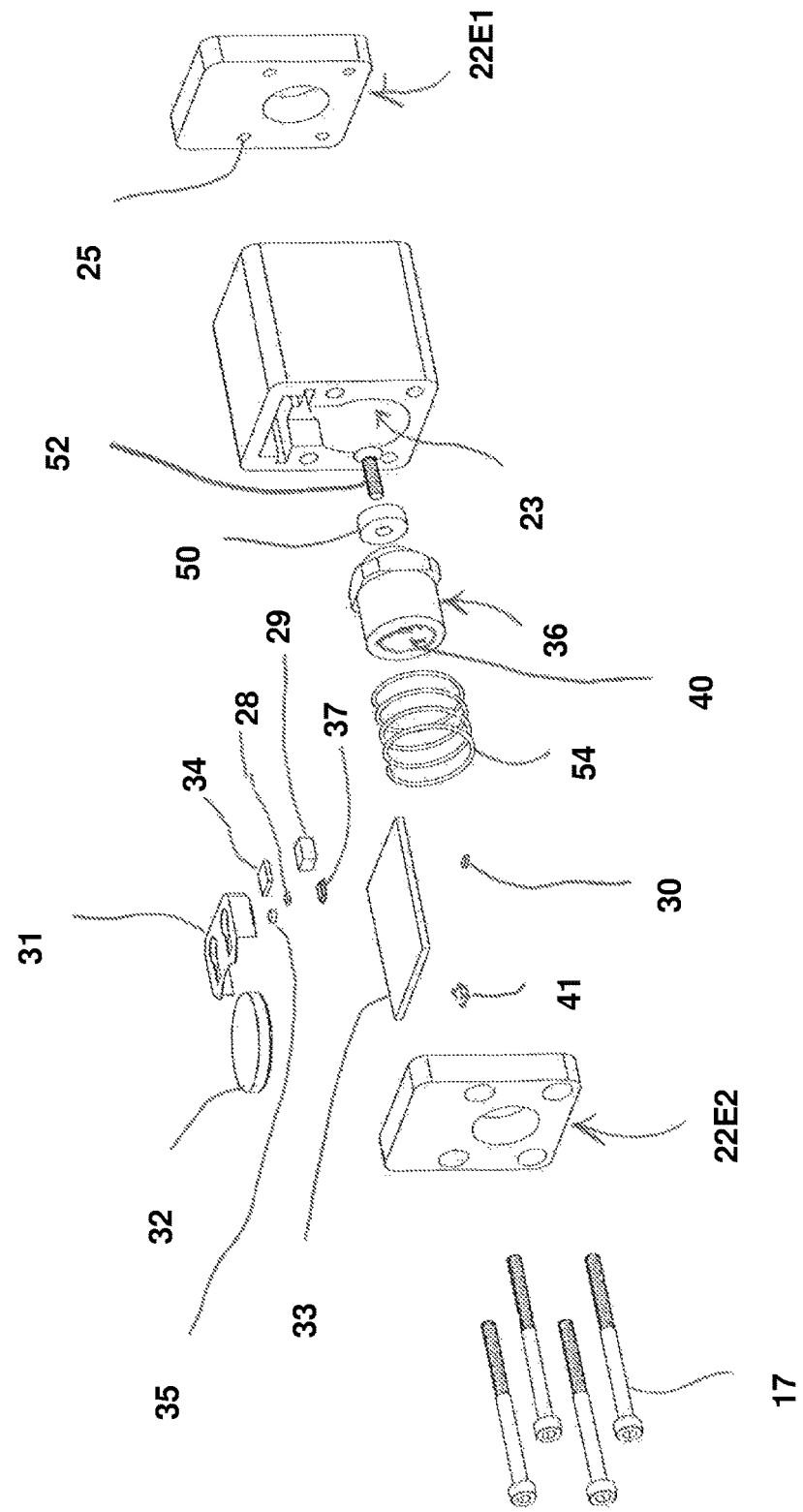
FIG. 3 is a is an exploded perspective view of the apparatus of FIG. 1A.

It should be understood that only structures considered necessary for clarifying the present invention are described herein. Other conventional structures, and those of ancillary and auxiliary components of the system, are assumed to be known and understood by those skilled in the art.

Referring now to FIGS. 1A-3 of the drawings, an air tool monitoring apparatus according to a first illustrative embodiment of the present invention is shown generally at 20. The apparatus 20 may be configured as a separate unit, configured to be attached to a conventional air tool.

Alternatively, the apparatus 20 may be configured as an integral, original equipment component, installed as part of the tool, such as an interior component of a tool handle, during manufacturing of an air tool.

The apparatus 20 functions by directly or indirectly measuring multiple application metrics of tool operation, either continuously or at a predefined time interval, and also records the data in on-board storage for intermittent transfer and for later analysis.

In this first embodiment as shown in FIGS. 1A-3, the air tool monitoring apparatus 20 is shown in a substantially rectangular block or parallelepiped shape with rounded corner portions, but the apparatus can be made in essentially any desired shape.

As shown in FIGS. 1A-3, the air tool monitoring apparatus 20 according to the first embodiment includes a hollow housing 22 having a primary housing chamber 23 formed therein. In the depicted embodiment, the housing 22 includes a main housing body 22B and first and second end plates 22E1 and 22E2, respectively.

Optionally, the housing 22 may have a secondary housing chamber 18 formed therein, to receive and store selected electronic components such as a battery, circuit board, timing circuit and microprocessor, to be described below. Optionally but not necessarily, the secondary housing chamber 18 may be separate from, and out of fluid communication with the primary housing chamber.

The first end plate 22E1 has a plurality of spaced-apart threaded bores 25 formed therein to receive threaded shaft portions of fasteners 17 therein. The housing 22 also has an inlet 24 and an outlet 26 formed therein, each of the inlet and an outlet being in fluid communication with the primary housing chamber 23, to allow compressed air to selectively flow through the housing and into a body portion of the air tool (not shown).

The apparatus 20 also includes a first sensor, such as, for example, a Hall effect sensor shown at 30, for sensing a condition indicative of tool activity, as well as a battery 32 disposed inside of the housing 22. A battery holder 31 may also be provided.

The first sensor may include one or more components selected from the list including accelerometers, air pressure sensors, Hall effect sensors, vibration sensors, and microphones.

In addition to the above, the apparatus 20 includes a circuit board 33 with a microprocessor 34 which is operatively connected to the housing. The circuit board 33 may be disposed in a slot formed inside of the housing 22, as shown. Alternatively, the circuit board 33 may be located on the outside of the housing, beneath an attached cover plate (not shown).

Figure 4:
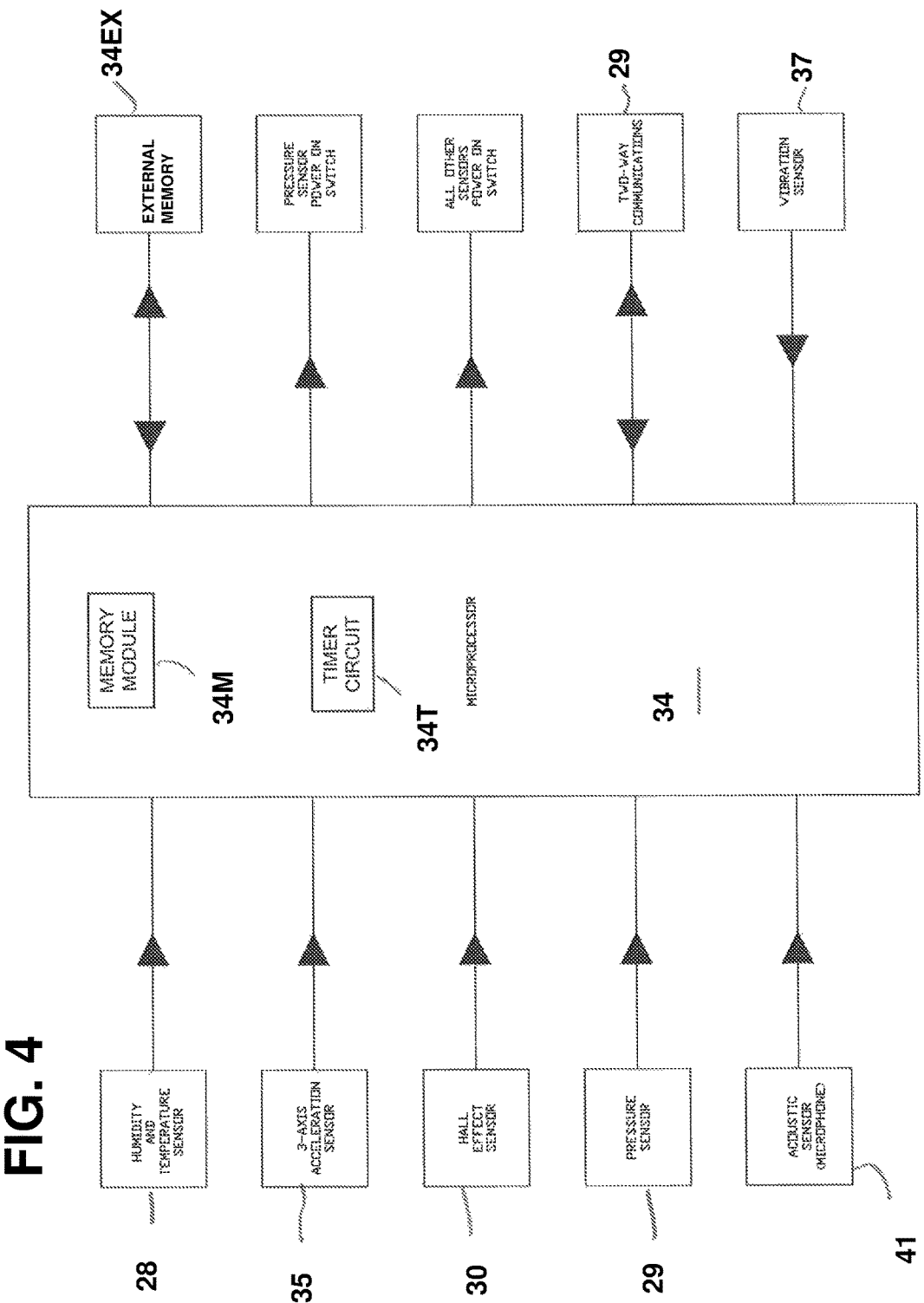
FIG. 4 is a generalized electrical diagram showing an illustrative electronic arrangement of the apparatus of FIG. 1A.
Figure 5A:
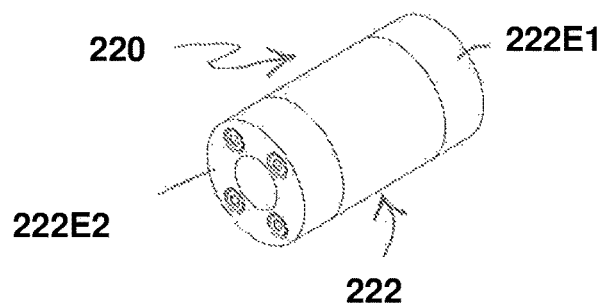
FIG. 5A a perspective view of an air tool monitoring apparatus according to a second illustrative embodiment of the present invention.
Figure 5B:
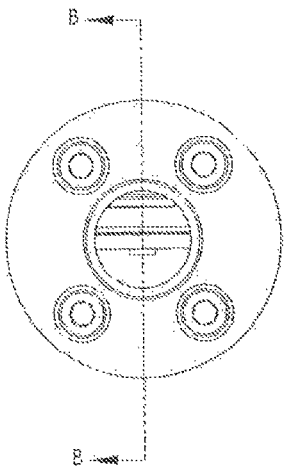
FIG. 5B is a first end plan view of the air tool monitoring apparatus of FIG. 5A, showing the outlet end.
Figure 5C:
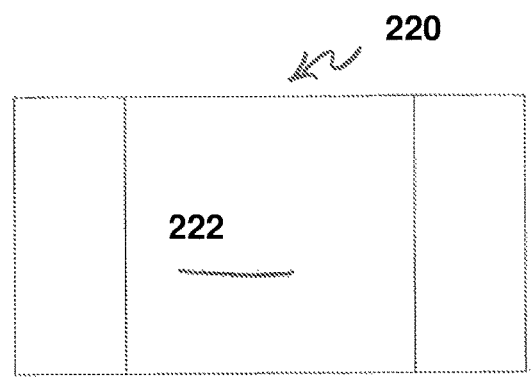
FIG. 5C is a side plan view of the air tool monitoring apparatus of FIG. 5A.
Figure 5D:
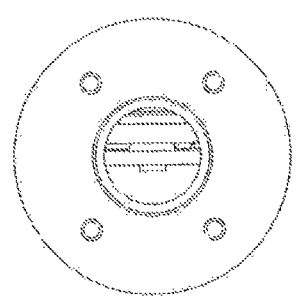
FIG. 5D is a second end plan view of the air tool monitoring apparatus of FIG. 5A, showing the inlet end.
Figure 6A:
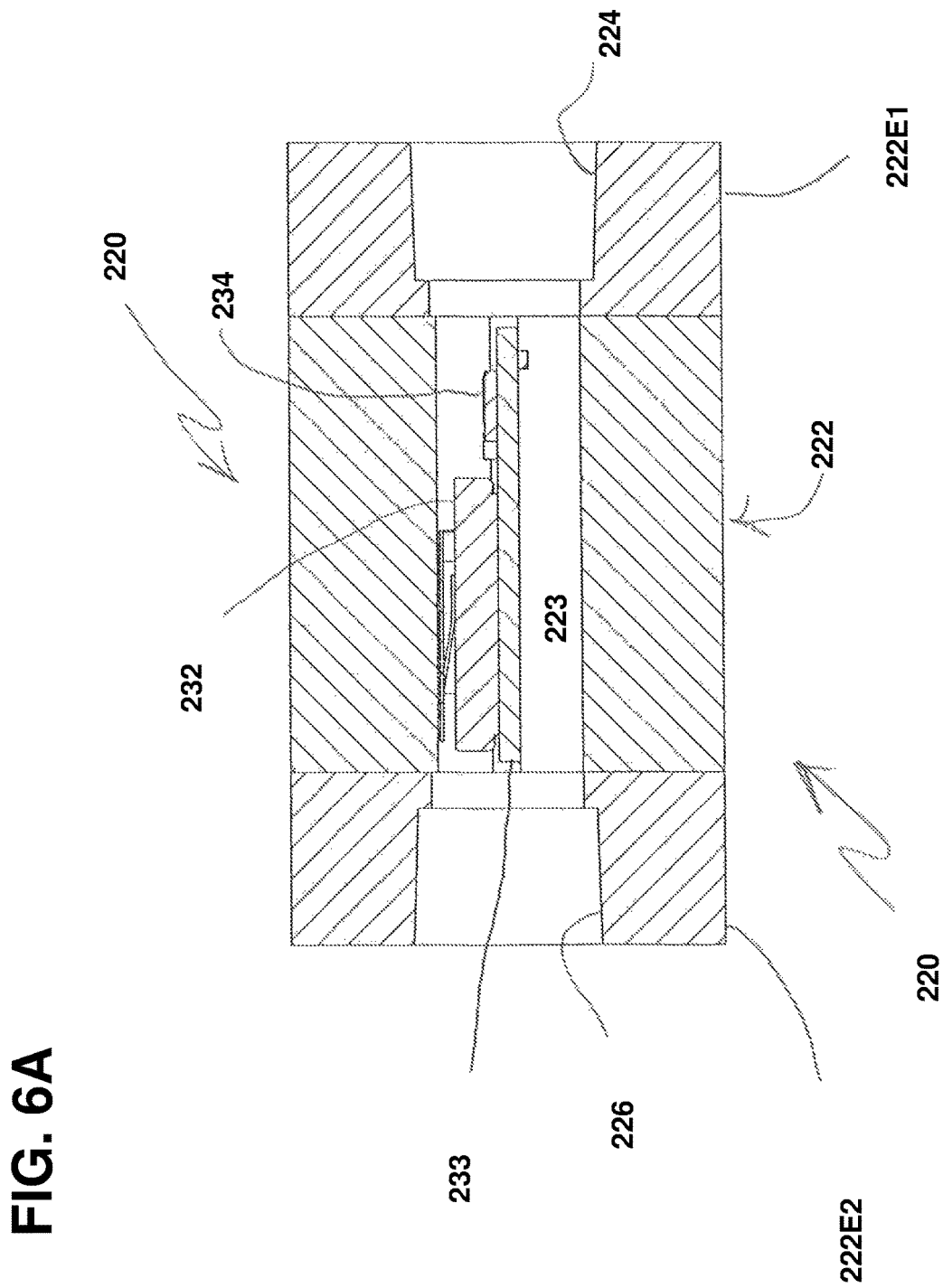
FIG. 6A is a first cross-sectional view of the apparatus of FIG. 5A, taken along line B-B of FIG. 5B, which line represents a central vertical plane extending in a direction parallel to a longitudinal axis.
Figure 7:
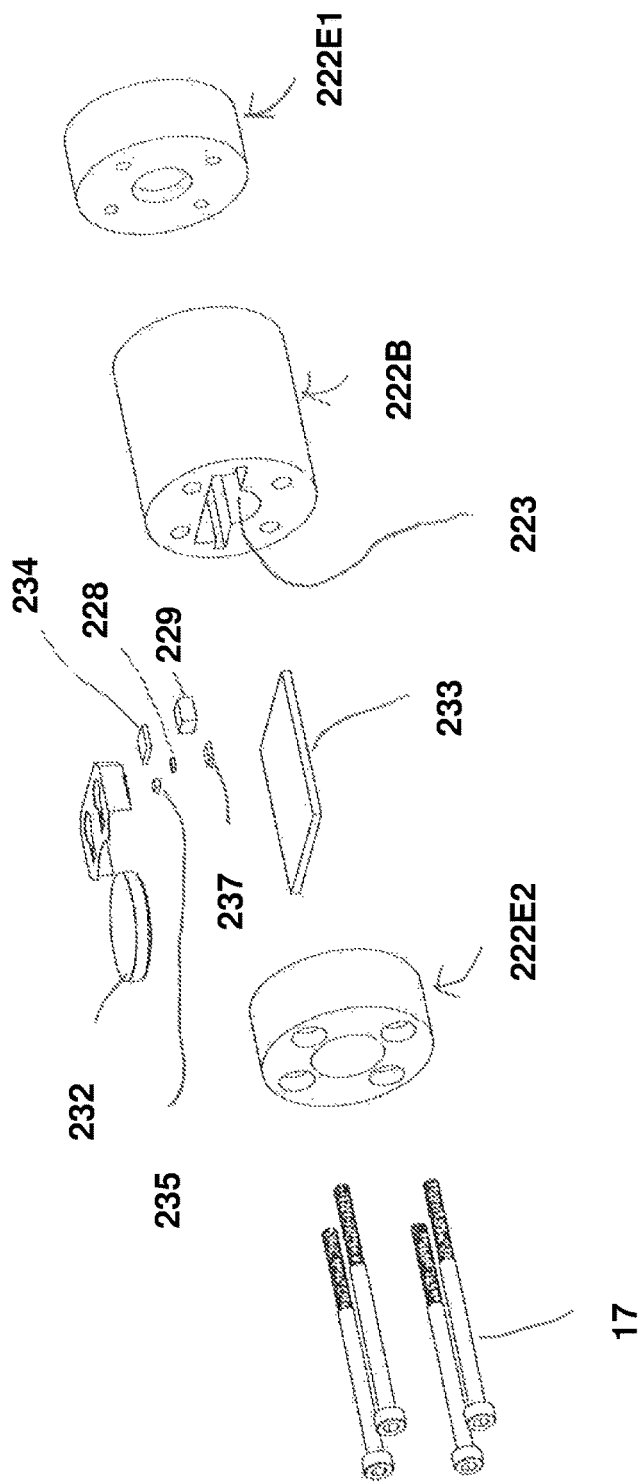
FIG. 7 is a is an exploded perspective view of the apparatus of FIG. 5A.

Referring also to FIG. 4, the microprocessor 34 includes a timer circuit 34T, a memory module 34M including RAM and ROM, which may be selectively programmable, and a unique identifier such as, for example, a serial number, which may be alphanumeric. The memory module 34M keeps a record of the total cumulative activity time of the tool. Additional external memory 34EX may be used, if required.

The microprocessor 34 is designed to remain off whenever the tool is not in use to extend the useful life of the battery 32, allowing the apparatus to use a relatively small battery, and the microprocessor is able to sense air flow or vibration when the tool is in use, and to begin recording parameters of tool operation at specified intervals throughout the time that the tool is in use, such as once every second, or at a longer interval. Optionally, the microprocessor 34 may be programmed to temporarily turn off or "sleep" between recordation sessions, and to wake up at the specified intervals to record data, in order to preserve battery life.

The circuit board 33 includes a switch for starting and stopping the timer in response to information from the first sensor 30. The switch may be a step programmed into the microprocessor 34, turning on the timer in response to input from the first sensor.

The circuit board 33 also includes at least one communication device 39 for sending data from the microprocessor to a data collection device, such as a server, local computer or smartphone app, which may be remotely located from the apparatus 20. The communication device(s) 39 may be capable of two-way communication, and may include one or more devices selected from Bluetooth, Wi-Fi, Radio Frequency (RF), Infrared sending and/or receiving unit, ANT+ Device, USB, serial, parallel, and FireWire© wired interface.

In the first embodiment of the apparatus shown in FIGS. 1A-3, the apparatus 20 includes a piston 36, which is slidably disposed in the primary housing chamber 23, and a permanent magnet 50, affixed to a front end of the piston with a fastener 52. The piston 36 is provided to move the magnet 50 rearwardly in the chamber 23 when air pressure at the inlet 24 reaches a level sufficient to move the piston, against a compressive force from a spring 54.

Such rearward movement of the magnet 50 is detected by the Hall effect sensor 30, which generates a "tool active" signal which is used by the microprocessor to switch both the timer and the microprocessor on.

The piston 36 includes a generally cylindrical reduced-diameter portion 38, which is configured and dimensioned to slidably receive the spring 54 thereon without any interference. The piston 36 has a hollow bore 40 formed therein, as shown.

The piston 36 also includes a conically tapered front end or nose portion 46, with a threaded opening formed centrally therein, which is configured to receive a threaded shaft portion of the fastener 52 for use in attaching the magnet 50. The nose portion 46 of the piston 36 also has a plurality of flow channels, such as those shown at 42 and 44 in FIG. 2A formed therethrough and communicating with the hollow bore 40.

A front end portion of the primary housing chamber 23 is formed in a partial conical shape, to provide a seat 47 for sealably receiving the nose portion 46 of the piston.

Optionally, the apparatus may additionally include a second sensor for sensing a condition indicative of tool wear. Where used, the second sensor may include one or more components selected from microphones, accelerometers, vibration sensors, and total usage recordation meters. The second sensor may be the same as, or different from the first sensor. The embodiment of the apparatus 20 shown in FIG. 3 includes a three-axis accelerometer 35, and an acoustic or vibration sensor 37, and may include a separate acoustic sensor 41 (FIG. 4)

Further, the apparatus may include a third sensor for sensing environmental conditions within the chamber, such as temperature, pressure, humidity, or the like. The embodiment of the apparatus 20 shown in FIG. 3 includes a sensor 28 for sensing both temperature and humidity, as well as a pressure sensor 29.

One example of a generalized circuit diagram which could be used for the apparatus of FIGS. 1A-3 is shown in FIG. 4.

Optionally, the apparatus may include a display device for displaying information to an operator regarding operation of the tool. Where used, such a display device may include a liquid crystal display or an LED display.

The apparatus 20 is capable of two-way communications with other supported devices (i.e. phone, tablet, laptop, workstation) using one or more appropriate protocols, in order to make programmatic changes (upgrades/patches), add/remove features, and transfer data to and from the device by utilizing custom software/firmware.

Second Embodiment

Referring now to FIGS. 5A-7 of the drawings, an air tool monitoring apparatus according to a second illustrative embodiment of the present invention is shown generally at 220. The apparatus 220 may be configured as a separate unit, configured to be attached to a conventional air tool.

Alternatively, the apparatus 220 may be configured as an integral, original equipment component, installed as part of the tool, such as an interior component of a tool handle, during manufacturing of an air tool.

The apparatus 220 functions by directly or indirectly measuring multiple application metrics of tool operation at a continuous predefined time interval, and also records the data in on-board storage for intermittent transfer and for later analysis.

The second embodiment of the apparatus 220 includes fewer components than the first embodiment. In this second embodiment as shown in FIGS. 5A-7, the air tool monitoring apparatus 220 is shown in a substantially cylindrical shape, but the apparatus can be made in essentially any desired shape.

As shown in FIGS. 5A-7, the air tool monitoring apparatus 220 according to the second embodiment includes a hollow housing 222 having a primary housing chamber 223 formed therein. In the depicted embodiment, the housing 222 includes a main housing body 222B and first and second end plates 22E1 and 22E2, respectively.

The first end plate 222E1 has a plurality of spaced-apart threaded bores 225 formed therein to receive threaded shaft portions of fasteners 17 therein. The housing 222 also has an inlet 224 and an outlet 226 formed therein, each of the inlet and an outlet being in fluid communication with the primary housing chamber 223, to allow compressed air to selectively flow through the housing and into a body portion of the air tool (not shown).

The apparatus 220 also includes a first sensor, such as, for example, the pressure sensor shown at 229 (FIG. 7), for sensing a condition indicative of tool activity, as well as a battery 232 disposed inside of the housing 222. A battery holder 231 may also be provided.

The first sensor may include one or more components selected from the list including accelerometers, air pressure sensors, vibration sensors, and microphones.

In addition to the above, the apparatus 220 includes a circuit board 233 with a microprocessor 234 which is operatively connected to the housing. The microprocessor 234 includes a timer circuit, a memory module including RAM and ROM, and a unique identifier such as, for example, a serial number, which may be alphanumeric. The memory module keeps a record of the total cumulative activity time of the tool.

The circuit board 233 includes a switch for starting and stopping the timer in response to information from the first sensor 230, and at least one communication device for sending data from the microprocessor to a data collection device, which may be remotely located. The communication device(s) may include one or more devices selected from Bluetooth, Wi-Fi, Radio Frequency (RF), Infrared sending and/or receiving unit, ANT+ wireless communication device, USB, serial, parallel, and FireWire© wired interface.

Optionally, the apparatus may additionally include a second sensor for sensing a condition indicative of tool wear. Where used, the second sensor may include one or more components selected from microphones, accelerometers, vibration sensors, and total usage recordation meters. The second sensor may be the same as, or different from the first sensor. The embodiment of the apparatus 220 shown in FIG. 7 includes a three-axis accelerometer 235, and an acoustic or vibration sensor 237.

Further, the apparatus may include a third sensor for sensing environmental conditions inside of the apparatus, such as temperature, pressure, humidity, or the like. The embodiment of the apparatus 20 shown in FIG. 3 includes a sensor 228 for sensing both temperature and humidity, as well as a pressure sensor 229.

Third Embodiment

Figure 8:
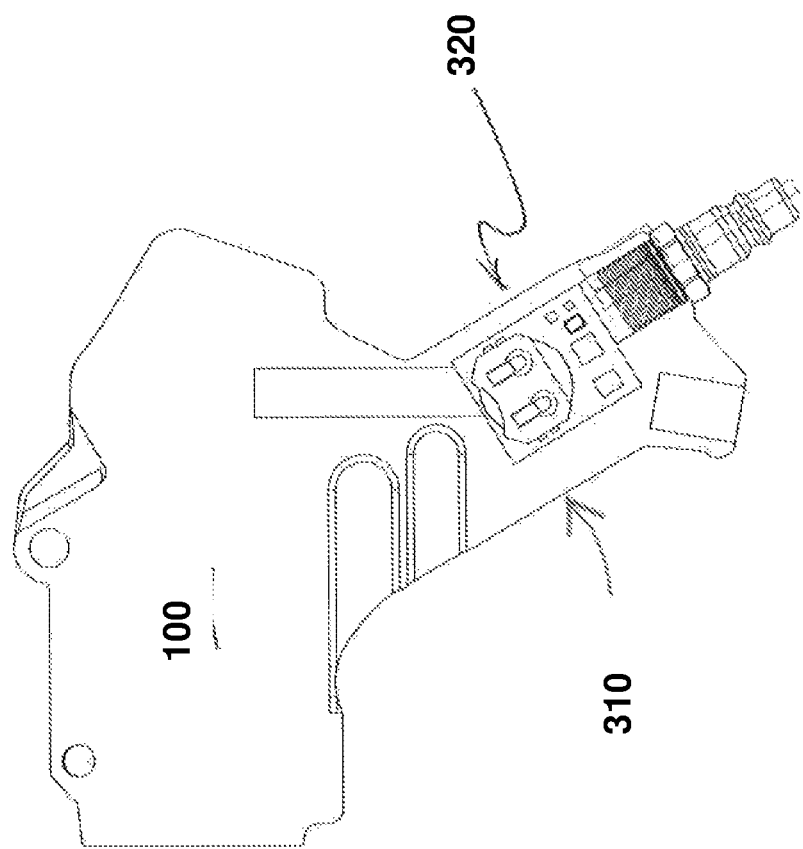
FIG. 8 is a cutaway view of an air tool having an apparatus according to the invention integrally installed inside of a handle portion of the tool.

Referring now to FIG. 8, an air tool is shown generally at 300. This air tool 300 is formed using the handle 310 of the tool as a housing of a third embodiment of the present invention, which can be configured substantially as described herein for the first or second embodiments, modified as appropriate.

System for Monitoring Multiple Air Tool Usage

A system for monitoring multiple air tool usage according to the present invention could be provided where each of the air tools in the system is provided with a tool usage monitoring apparatus, such as the apparatus 20 or 220 described herein. The system includes a main control processor which intermittently receives input data from each of the air tools included in the system. The main control processor includes a non-volatile memory which has a plurality of maps stored therein indicating normal operating parameters indicative of normal and acceptable tool operating conditions, cautionary operating parameters indicative of either a need for scheduled maintenance or approaching failure or obsolescence, and "red flag" operating parameters indicative of a failing or dangerous tool which should be removed from operation.

The main control processor could be programmed to print a daily or weekly report showing operating parameters for each tool. In addition, the main control processor could be programmed to issue a warning to plant management, at specified intervals, that specific tools are in need of repair or replacement if the performance of such tools indicate such conditions.

For example, if the accelerometer or vibration sensor indicates a level of vibration out of specifications, the tool containing such sensor may need to be taken out of use due to possible tool failure or a possible safety risk to an operator or user of the tool.

Method of Use

The present invention also relates to a method of using the air tool monitoring apparatus as described herein, where such monitoring apparatus is operatively attached to an air tool.

Figure 9:
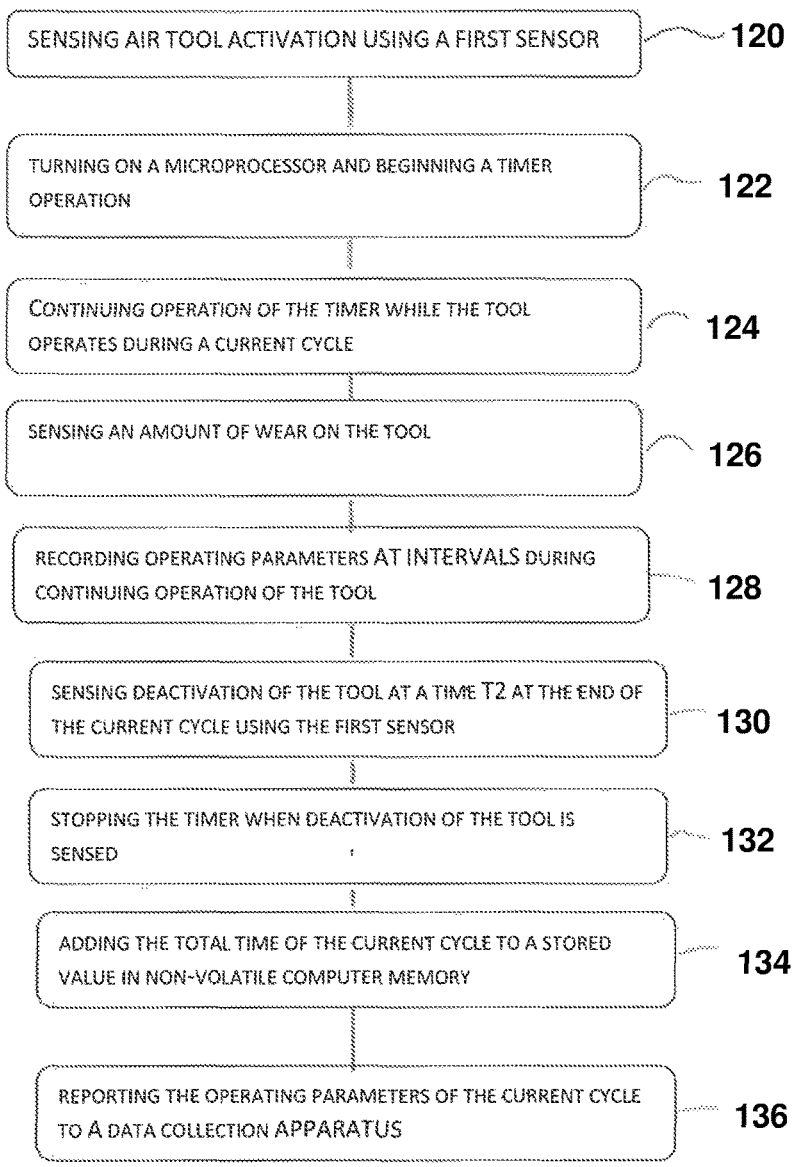
FIG. 9 is a flow chart showing steps in an exemplary method of using the apparatus hereof.

The method according to the invention includes a first step of sensing when the air tool is activated at an initial time T1 using a first sensor, such as the Hall effect sensor 30, the vibration sensor or the accelerometer. This step is shown at 120 in the flow chart of FIG. 9.

The method according to the invention also includes a step of turning on a microprocessor and beginning operation of a timer at time T1 in response to the sensed activation of the tool. This step is shown at 122 in the flow chart of FIG. 9.

The method according to the invention also includes a step of sensing an amount of wear on the tool using a second sensor which may be the same as, or different from the first sensor. This step is shown at 126 in the flow chart of FIG. 9.

The method according to the invention also includes a step of continuing operation of the timer while the tool operates during a current cycle. This step is shown at 124 in the flow chart of FIG. 9. Steps 124 and 126 may be performed in any order.

The method according to the invention also includes a step of recording operating parameters at least once per hour during the current cycle, using at least one third sensor which is an environmental sensor. This step is shown at 128 in the flow chart of FIG. 9.

The method according to the invention also includes a step of sensing deactivation of the tool at a time T2 at the end of the current cycle using the first sensor. This step is shown at 130 in the flow chart of FIG. 9.

The method according to the invention also includes a step of stopping the timer when deactivation of the tool is sensed. This step is shown at 132 in the flow chart of FIG. 9.

The method according to the invention also includes a step of adding the total time of the current cycle to a stored value in non-volatile computer memory, where the stored value represents total usage time of the tool. This step is shown at 134 in the flow chart of FIG. 9.

Optionally, the method according to the invention may include a reporting step of transmitting data representative of the operating parameters of the tool during the current cycle to a data collector. This step is shown at 136 in the flow chart of FIG. 9.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. An air tool monitoring apparatus, comprising:
a housing configured for placement in an air supply line for a pneumatic air tool and to receive an air stream passing therethrough during operation of the air tool, the housing having a hollow chamber formed therein, and also having an inlet and an outlet formed therein, each of the inlet and an outlet being in fluid communication with the chamber;
a first sensor for operatively detecting air flow through the housing;
a second sensor operatively attached to the housing for sensing a condition indicative of tool wear;
a battery disposed in the housing;
a microprocessor operatively connected to the housing and comprising a timer, RAM, ROM, and a unique identifier; and
a communication device for sending data from the microprocessor to a data collection device.

2. The apparatus of claim 1, wherein the second sensor comprises at least one component selected from microphones, accelerometers, vibration sensors, and total usage meters.

3. An air tool comprising a handle having the apparatus of claim 1 therein.

4. The apparatus of claim 1, wherein the apparatus is programmed to temporarily turn off during a time between sequences of recording operating parameters.

5. The apparatus of claim 1, further comprising:
a piston slidably disposed in the housing, the piston having a hollow bore formed therein, and having a first end with a truncated conical nose portion having at least one air passage formed therein, the piston having a second end with a generally cylindrical reduced-diameter portion which is configured and dimensioned to slidably receive a spring thereon, and
a spring disposed on the reduced-diameter portion for biasing the piston toward the inlet,
wherein the first sensor is configured to detect movement of the piston in a direction away from the inlet.

6. The apparatus of claim 1, wherein the hollow chamber of the housing is a primary chamber, and the housing further has a secondary chamber formed therein which is separate from, and out of fluid communication with the primary housing chamber, wherein the microprocessor and the battery are disposed in the secondary housing chamber.

7. The apparatus of claim 1, wherein the housing comprises a main housing body containing the hollow chamber, and at least one end plate removably connected to the main housing body with fasteners, to permit selective access to an interior of the main housing body.

8. The apparatus of claim 5, further comprising a magnet attached to the piston, wherein the first sensor is a Hall effect sensor.

9. The apparatus of claim 5, wherein an end portion of the primary housing chamber proximate the inlet is formed in a partial conical shape, to provide a seat for sealably receiving the nose portion of the piston.

10. An air tool comprising a handle having the apparatus of claim 5 therein.

11. An air tool monitoring apparatus, comprising:
a housing configured for placement in an air supply line for a pneumatic air tool and to receive an air stream passing therethrough during operation of the air tool, the housing comprising a main housing body having a hollow chamber formed therein, and also having an inlet and an outlet formed therein, each of the inlet and an outlet being in fluid communication with the chamber, and at least one end plate removably connected to the main housing body with fasteners, to permit selective access to an interior of the main housing body;
a first sensor for operatively detecting air flow through the housing;
a second sensor operatively attached to the housing for sensing a condition indicative of tool wear;
a battery disposed in the housing;
a microprocessor operatively connected to the housing and comprising a timer, RAM, ROM, and a unique identifier; and
a communication device for sending data from the microprocessor to a data collection device.

12. The apparatus of claim 11, wherein the second sensor comprises at least one component selected from microphones, accelerometers, vibration sensors, and total usage meters.

13. The apparatus of claim 11, further comprising:
- a piston slidably disposed in the housing, the piston having a hollow bore formed therein, and having a first end with a truncated conical nose portion having at least one air passage formed therein, the piston having a second end with a generally cylindrical reduced-diameter portion which is configured and dimensioned to slidably receive a spring thereon, and
- a spring disposed on the reduced-diameter portion for biasing the piston toward the inlet,
- wherein the first sensor is configured to detect movement of the piston in a direction away from the inlet.

14. The apparatus of claim 11, wherein the hollow chamber of the housing is a primary chamber, and the housing further has a secondary chamber formed therein which is separate from, and out of fluid communication with the primary housing chamber, wherein the microprocessor and the battery are disposed in the secondary housing chamber.

15. The apparatus of claim 11, wherein the apparatus is programmed to temporarily turn off during a time between sequences of recording operating parameters.

16. The apparatus of claim 13, further comprising a magnet attached to the piston, wherein the first sensor is a Hall effect sensor.

17. The apparatus of claim 13, wherein an end portion of the primary housing chamber proximate the inlet is formed in a partial conical shape, to provide a seat for sealably receiving the nose portion of the piston.

* * * * *